(12) United States Patent
Tsai

(10) Patent No.: US 9,172,256 B2
(45) Date of Patent: Oct. 27, 2015

(54) BATTERY MANAGEMENT CIRCUIT AND BATTERY MANAGEMENT METHOD FOR MANAGING BATTERY APPARATUS

(71) Applicant: Fu-Sheng Tsai, Taoyuan County (TW)

(72) Inventor: Fu-Sheng Tsai, Taoyuan County (TW)

(73) Assignee: Fu-Sheng Tsai, Taoyuan Dist., Taoyuan (TW)

( * ) Notice: Subject to any disclaimer, the term of this patent is extended or adjusted under 35 U.S.C. 154(b) by 183 days.

(21) Appl. No.: 13/940,237

(22) Filed: Jul. 11, 2013

(65) Prior Publication Data
US 2014/0015477 A1 Jan. 16, 2014

Related U.S. Application Data

(60) Provisional application No. 61/671,099, filed on Jul. 13, 2012.

(51) Int. Cl.
*H02J 7/00* (2006.01)
*G06F 17/50* (2006.01)

(52) U.S. Cl.
CPC ........... *H02J 7/0014* (2013.01); *G06F 17/5009* (2013.01); *H02J 7/0016* (2013.01); *H02J 7/0042* (2013.01); *G06F 2217/78* (2013.01)

(58) Field of Classification Search
CPC ....... H02J 7/0073; H02J 7/0093; H02J 17/00; H02J 5/005; H02J 7/0016; H02J 7/0047; H02J 7/071; H02J 7/045; H02J 7/082; H02J 7/085; H02J 7/0068; H02J 7/0091; H02J 7/0004; H02J 7/0006; H02J 7/00
USPC .................................................. 320/105–110
See application file for complete search history.

(56) References Cited

U.S. PATENT DOCUMENTS

2004/0232887 A1* 11/2004 Rositch ......................... 320/147
2008/0157721 A1* 7/2008 Kaneko et al. ................ 320/136

* cited by examiner

*Primary Examiner* — Binh Tat
(74) *Attorney, Agent, or Firm* — Winston Hsu; Scott Margo

(57) ABSTRACT

A battery management circuit for managing a battery apparatus is provided. The battery apparatus includes at least a first battery unit and a second battery unit connected in parallel. The battery management circuit includes a detection circuit and an adjustment circuit. The detection circuit is arranged to detect a voltage relationship between the first and second battery units to generate a first detection result. The adjustment circuit is coupled to the detection circuit. When the voltage relationship does not meet a predetermined voltage condition, the adjustment circuit is arranged to adjust a voltage of at least one of the first and second battery units in order to make the voltage relationship meet the predetermined voltage condition.

16 Claims, 7 Drawing Sheets

BATTERY MANAGEMENT CIRCUIT AND BATTERY MANAGEMENT METHOD FOR MANAGING BATTERY APPARATUS

CROSS REFERENCE TO RELATED APPLICATIONS

This application claims the benefit of U.S. provisional application No. 61/671,099, filed on Jul. 13, 2012, the contents of which are incorporated herein by reference.

BACKGROUND OF THE INVENTION

1. Field of the Invention

The disclosed embodiments of the present invention relate to battery management, and more particularly, to a battery management circuit, which increases an amount of power supply of a battery apparatus by hot-plugging batteries, and a related battery management method.

2. Description of the Prior Art

In order to increase an amount of power supply of a battery power system (BPS), an auxiliary battery is used to increase the overall battery capacity. For example, if the user finds out that an amount of stored power of a main battery is insufficient during the operation of the BPS, the auxiliary battery may need to be added in order to maintain the normal operation of the power system. However, when a voltage difference between the added auxiliary battery and the main battery is too great, hot-plugging (or hot-swapping) the auxiliary battery may result in high surge current or even damage to the BPS.

Thus, a novel battery management circuit is needed to prevent damage to the BPS during the hot-plug operation.

SUMMARY OF THE INVENTION

It is therefore one objective of the present invention to provide a battery management circuit, which increases an amount of power supply of a battery apparatus by hot-plugging batteries, and a related battery management method to solve the above problems.

According to an embodiment of the present invention, an exemplary battery management circuit for managing a battery apparatus is disclosed. The battery apparatus comprises at least a first battery unit and a second battery unit connected in parallel. The battery management circuit comprises a detection circuit and an adjustment circuit. The detection circuit is arranged to detect a voltage relationship between the first and second battery units to generate a first detection result. The adjustment circuit is coupled to the detection circuit. When the voltage relationship does not meet a predetermined voltage condition, the adjustment circuit is arranged to adjust a voltage of at least one of the first and second battery units in order to make the voltage relationship meet the predetermined voltage condition.

According to an embodiment of the present invention, an exemplary battery management method for managing a battery apparatus is disclosed. The battery apparatus comprises at least a first battery unit and a second battery unit connected in parallel. The battery management method comprises the following steps: detecting a voltage relationship between the first and second battery units to generate a first detection result; and when the voltage relationship does not meet a predetermined voltage condition, adjusting a voltage of at least one of the first and second battery units in order to make the voltage relationship meet the predetermined voltage condition.

The proposed battery management mechanism may reduce/eliminate surge current effectively and is applicable to different power management modes. The proposed battery management mechanism may also be applied to manage more than one battery unit (e.g. three battery units). Hence, even if more than one battery unit is hot-plugged/unplugged, the battery power system may still provide an excellent power output.

These and other objectives of the present invention will no doubt become obvious to those of ordinary skill in the art after reading the following detailed description of the preferred embodiment that is illustrated in the various figures and drawings.

DETAILED DESCRIPTION

In order to prevent hot-plugging/unplugging from generating large surge current, the proposed battery management circuit may properly adjust battery voltage(s) by detecting a voltage relationship between a plurality of batteries in a battery power system (BPS) and a power management mode of the BPS, thereby eliminating/reducing the surge current. Further description is detailed as follows.

Figure 1:
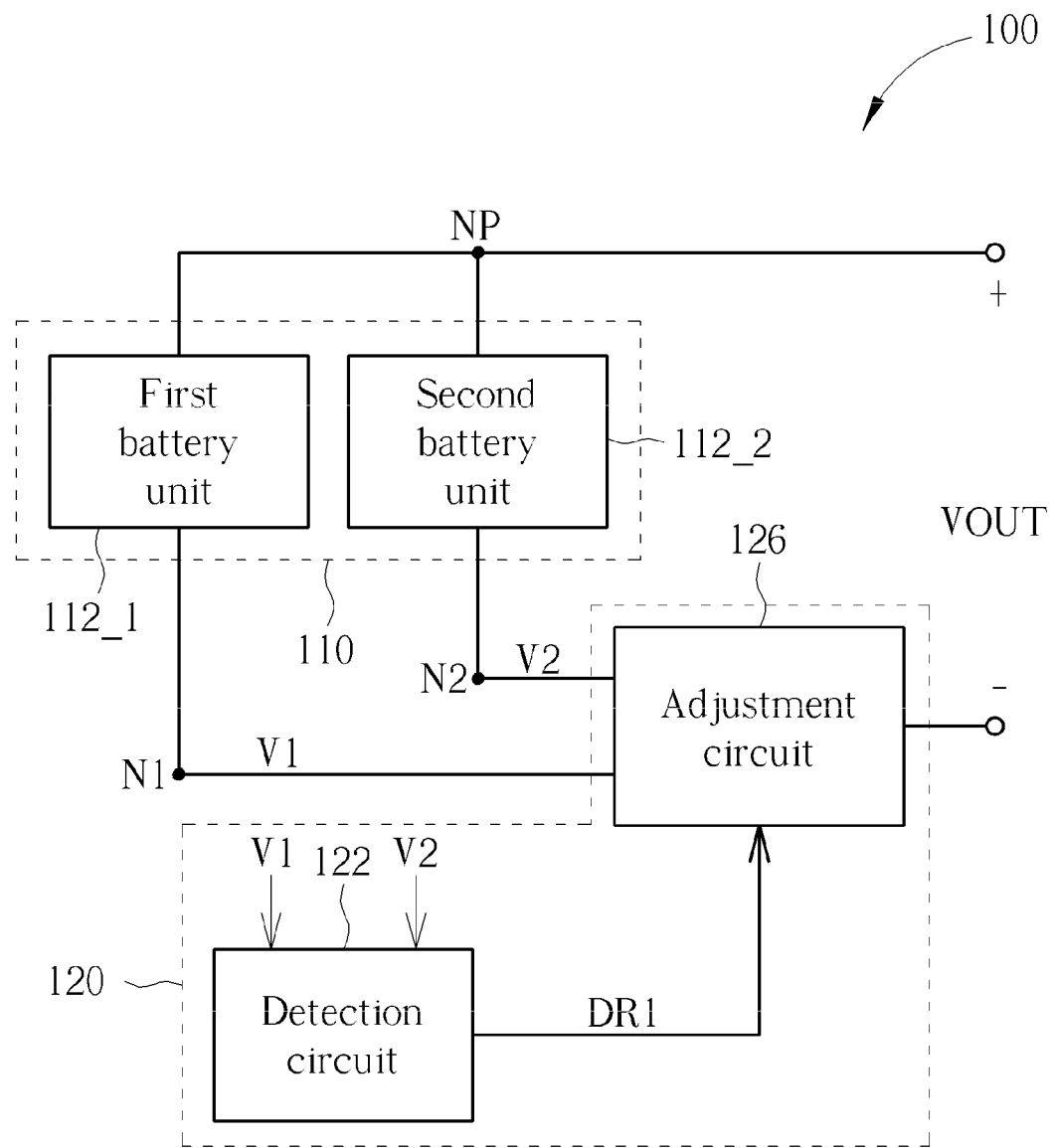
FIG. 1 is a block diagram illustrating an exemplary battery power system according to an embodiment of the present invention.

Please refer to FIG. 1, which is a block diagram illustrating an exemplary BPS according to an embodiment of the present invention. The BPS 100 may include a battery apparatus 110 and a battery management circuit 120, wherein the battery apparatus 110 may provide an output voltage VOUT according to a management operation of the battery management circuit 120. In this embodiment, the battery apparatus 110 may include a first battery unit 112_1 and a second battery unit 112_2, wherein the first battery unit 112_1 and the second battery unit 112_2 are coupled in parallel between a node NP and battery management circuit 120. The second battery unit 112_2 is installed in the battery apparatus 110 after the first battery unit 112_1 has been installed. In other words, the first battery unit 112_1 may be regarded as a main battery of the battery apparatus 110, and the second battery unit 112_2 may be regarded as an auxiliary battery of the battery apparatus 110. When the second battery unit 112_2 is added to the battery apparatus 110, the battery management circuit 120 may need to perform the battery management operation upon the battery apparatus 110 in order to prevent the surge current from damaging the BPS 100.

The battery management circuit 120 may detect a voltage relationship between the first battery unit 112_1 and the second battery unit 112_2, and accordingly selectively adjust a voltage of at least one of the first battery unit 112_1 and the second battery unit 112_2 in order to avoid a too great voltage difference therebetween, thereby reducing the surge current. Specifically, the battery management circuit 120 may include a detection circuit 122 and an adjustment circuit 126. The detection circuit 122 is arranged for detecting the voltage relationship between the first battery unit 112_1 and the second battery unit 112_2 to generate a first detection result DR1. When the first detection result DR1 indicates that the voltage relationship does not meet a predetermined voltage condition (e.g. the voltage difference exceeds a predetermined voltage range), the adjustment circuit 126 may be arranged to adjust a voltage of at least one of the first battery unit 112_1 and the second battery unit 112_2 in order to make the voltage relationship meet the predetermined voltage condition (e.g. the voltage difference is within the predetermined voltage range). Please note that the BPS 100 may continue providing the output voltage VOUT before or after the adjustment circuit 126 completes the aforementioned voltage adjustment. Additionally, the BPS 100 may also continue providing the output voltage VOUT during the aforementioned voltage adjustment.

As the first battery unit 112_1 is coupled between the node NP and a node N1, and the second battery unit 112_2 is coupled between the node NP and a node N2, the detection circuit 122 may receive a voltage V1 of the node N1 and a voltage V2 of the node N2 to detect the voltage relationship between the first battery unit 112_1 and the second battery unit 112_2. Please note that, in one implementation, the detection circuit 122 may directly refer to a voltage difference between the voltage V1 and the voltage V2 to detect the voltage relationship.

A voltage relationship indicated by the first detection result DR1 is not limited to a voltage difference between a plurality of battery units, and a predetermined voltage condition is not limited to "the voltage difference is within a predetermined voltage range". For example, the voltage relationship indicated by the first detection result DR1 may be a voltage ratio between the battery units, and the predetermined voltage condition may be "the voltage ratio is less than a predetermined ratio". As long as the proposed battery management circuit may detect voltages of battery units and selectively adjust the voltages according to the detection result, various modifications may be made without departing from the spirit and scope of the invention.

In view of the above, by employing the management operation of the battery management circuit 120, the BPS 100 will not be damaged when a battery is hot-plugged into (or hot-unplugged from) the battery apparatus 110. Please note that the number of the battery units in the battery apparatus 110 is not meant to be a limitation of the present invention. In a case where the battery apparatus 110 further includes other battery units (not shown in FIG. 1), it is feasible to employ the aforementioned battery management mechanism to eliminate/reduce the surge current.

The battery management circuit 120 shown in FIG. 1 is a basic architecture based on the concept of the present invention. Any circuit employing the architecture shown in FIG. 1 falls within the scope of the present invention. To facilitate an understanding of the present invention, an exemplary implementation is given in the following for further description of the proposed battery management circuit. It should be noted that other circuit implementations employing the architecture shown in FIG. 1 are feasible. Please refer to FIG. 2, which is a diagram illustrating an exemplary BPS according to an embodiment of the present invention. The BPS 200 may include a battery apparatus 210 and a battery management circuit 220, wherein the architecture of the battery management circuit 220 is based on that of the battery management circuit 120 shown in FIG. 1. In this embodiment, the battery apparatus 210 includes a first battery unit 212_1 and a second battery unit 212_2, wherein the first battery unit 212_1 and the second battery unit 212_2 include series-connected batteries B1_1-B1_m and series-connected batteries B2_1-B2_n, respectively. For illustrative purposes, the first battery unit 212_1 may be regarded as a main battery of the battery apparatus 210, and the second battery unit 212_2 may be regarded as an auxiliary battery of the battery apparatus 210. Hence, when the second battery unit 212_2 is added to the battery apparatus 210, the battery management circuit 220 may need to perform a battery management operation upon the battery apparatus 210.

The battery management circuit 220 may include a detection circuit 222 and an adjustment circuit 226, wherein detection circuit 222 is arranged to detect a voltage relationship between the first battery unit 212_1 and the second battery unit 212_2 according to the voltage V1 of the node N1 and the voltage V2 of the node N2, and accordingly generate a first detection result DR1. In this embodiment, the detection circuit 222 may include a comparison unit 224, which is arranged to compare a predetermined voltage range with a voltage difference between the first battery unit 212_1 and the second battery unit 212_2, and accordingly generate the first detection result DR1. The adjustment circuit 226 is coupled to the detection circuit 222, and includes a plurality of first switch devices CM1 and CM2 and a plurality of second switch devices DM1 and DM2. The first switch device CM1 and the second switch device DM1 are coupled to each other, and the first switch device CM2 and the second switch device DM2 are coupled to each other. In this embodiment, the switch devices DM1, DM2, CM1 and CM2 are implemented by a plurality of switch transistors, wherein the switch transistors have a plurality of body diodes DD1, DD2, CD1 and CD2, By way of example but not limitation, at least one of the switch devices DM1, DM2, CM1 and CM2 may be implemented by a metal-oxide-semiconductor field-effect transistor (MOSFET). A person skilled in the art should understand that switch devices DM1, DM2, CM1 and CM2 may be implemented by other types of switch devices.

When the first detection result DR1 indicates that the voltage relationship meets the predetermined voltage condition (e.g. the voltage difference between the voltages V1 and V2 is within the predetermined voltage range), it implies that the BPS 200 is almost unaffected by the surge current. The voltages of the first battery unit 212_1 and the second battery unit 212_2 will not be adjusted. In other words, each of the switch devices DM1, DM2, CM1 and CM2 may be turned on. When the first detection result DR1 indicates that the voltage relationship does not meet the predetermined voltage condition (e.g. the voltage difference between the voltages V1 and V2 is not within the predetermined voltage range), it implies that the battery management circuit 220 needs to perform the voltage adjustment upon at least one of the first battery unit 212_1 and the second battery unit 212_2 in order to prevent the surge current from affecting the BPS 200. In brief, the switch devices DM1, DM2, CM1 and CM2 may be selectively turned on according to the first detection result DR1.

The BPS may provide a plurality of power management modes. In different power management modes, corresponding battery management operations required by the battery apparatus may be different. In the embodiment shown in FIG.

2, the BPS 200 may further include a charging circuit 230, a direct current to direct current converter (DC-DC converter) 240, a direct current to alternating current converter (DC-AC converter) 250 and a plurality of resistors R1 and R2, wherein the resistors R1 and R2 may be used to detect current. The battery apparatus 210 may generate an output voltage VOUT through the battery management circuit 220; the charging circuit 230 may be arranged to receive an input voltage VS and accordingly charge the battery apparatus 210; the DC-DC converter 240 may be arranged to convert the output voltage VOUT into a DC voltage VDC, and provide the DC voltage VDC for an external load (not shown in FIG. 2); and the DC-AC converter 250 may be arranged to convert the output voltage VOUT into an AC voltage VAC, and provide AC voltage VAC for an external load (not shown in FIG. 2).

In this embodiment, when the battery apparatus 210 is electrically connected to an external power source (e.g. electrically connected the input voltage VS through the charging circuit 230), the battery apparatus 210 operates in a charging mode; when the battery apparatus 210 is not electrically connected to the external power source and does not provide the output voltage VOUT for the external load, the battery apparatus 210 operates in an idle mode; and when the battery apparatus 210 is not electrically connected to the external power source but provides the output voltage VOUT for the external load, the battery apparatus 210 operates in a discharging mode.

In order to manage the battery apparatus in different power management modes, when the first detection result DR1 indicates that the voltage relationship does not meet the predetermined voltage condition, the detection circuit 222 may further detect a power management mode of the battery apparatus 210 to generate a second detection result DR2, and the adjustment circuit 226 may adjust a voltage of at least one of the first battery unit 212_1 and the second battery unit 212_2 according to the second detection result DR2. Battery management operations corresponding to different power management modes are described as below.

Figure 2:
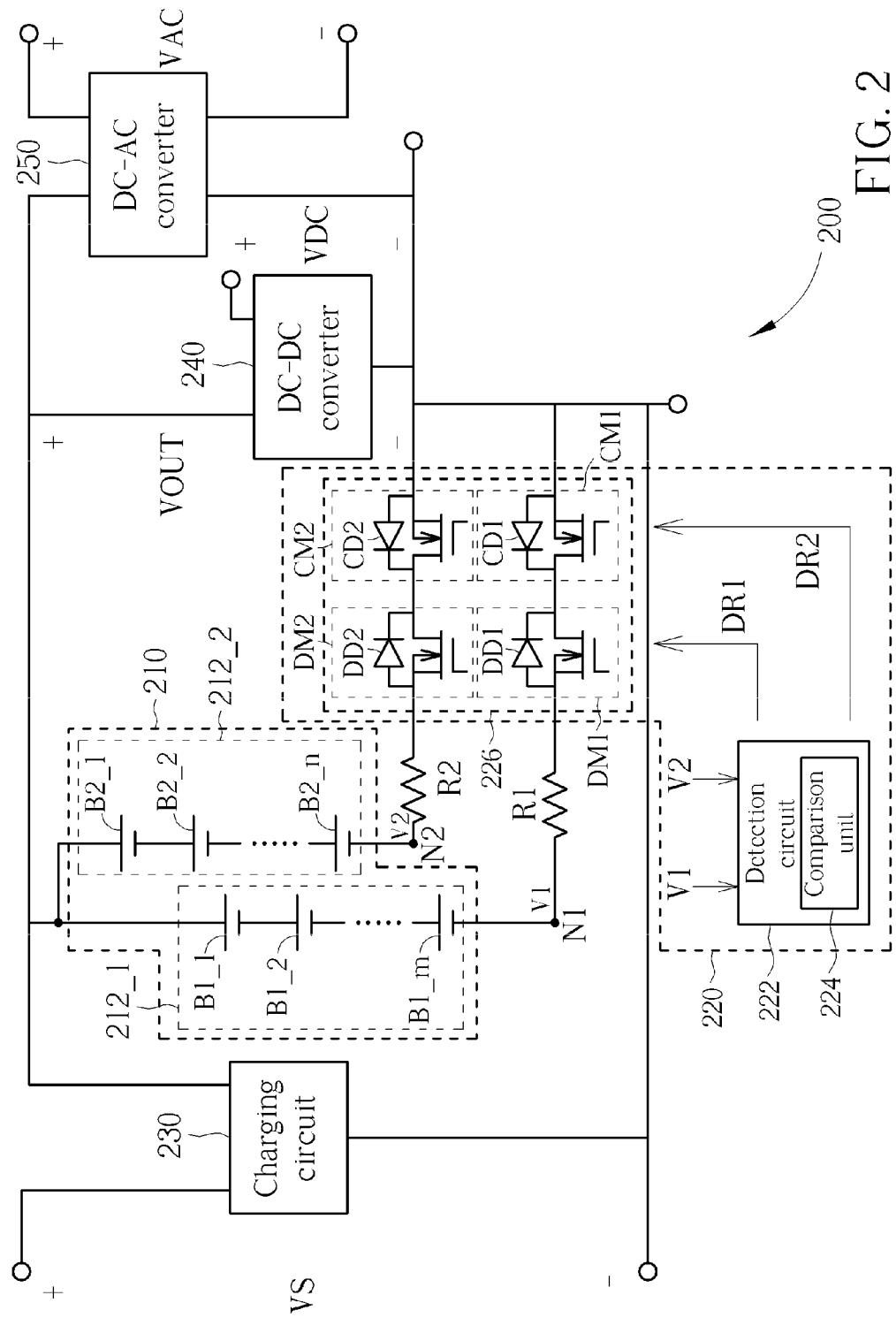
FIG. 2 is a diagram illustrating an exemplary battery power system according to an embodiment of the present invention.
Figure 3:
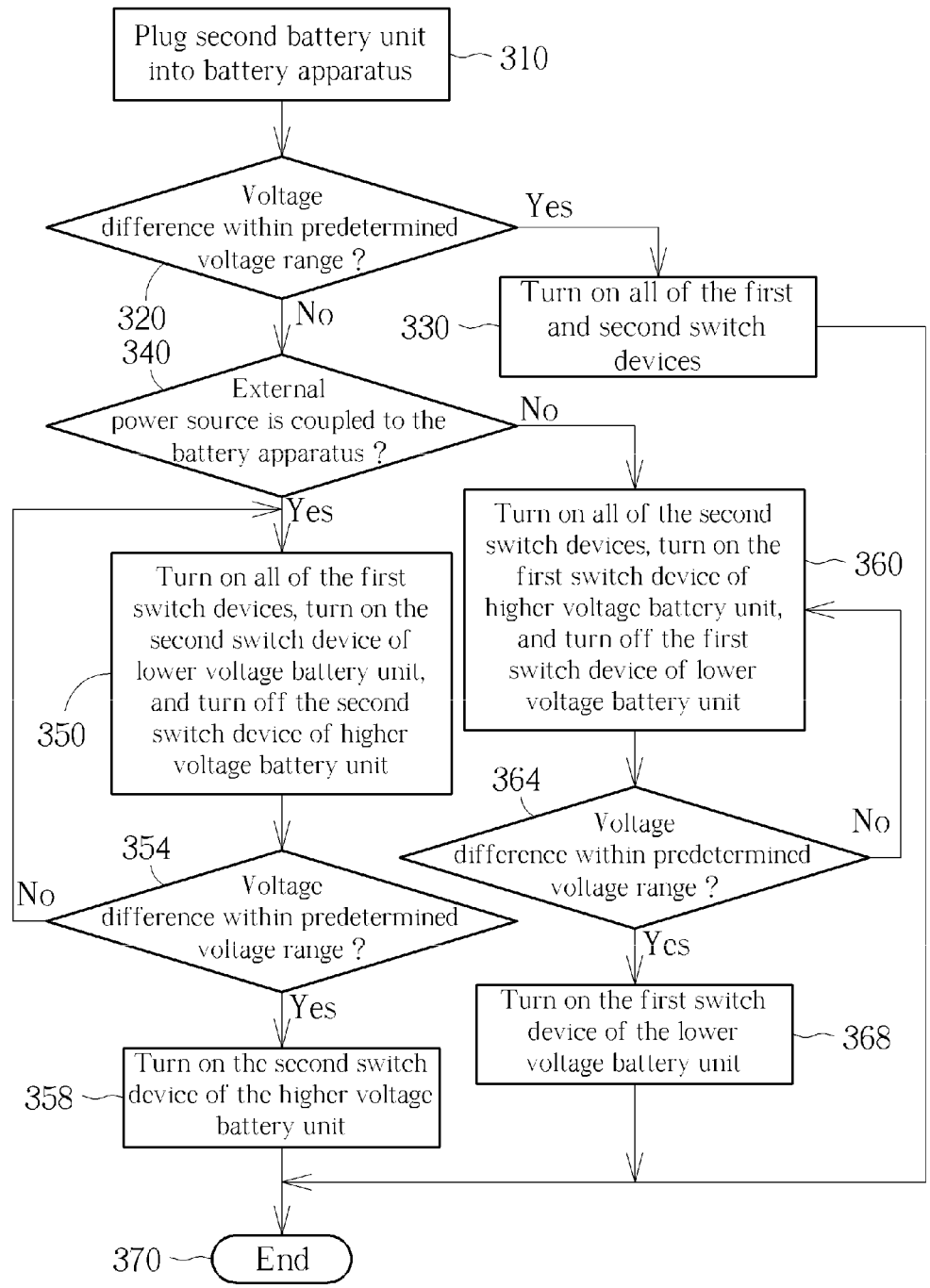
FIG. 3 is a flowchart illustrating an exemplary battery management method for managing the battery apparatus shown in FIG. 2 according to an embodiment of the present invention.

Please refer to FIG. 3 in conjunction with FIG. 2. FIG. 3 is a flowchart illustrating an exemplary battery management method for managing the battery apparatus 210 shown in FIG. 2 according to an embodiment of the present invention. As mentioned above, when the second battery unit 212_2 (i.e. the auxiliary battery) is plugged into the battery apparatus 210 (in step 310), the battery management circuit 220 may need to perform the battery management operation upon the battery apparatus 210. First, the detection circuit 222 may detect if the voltage difference between the first battery unit 212_1 and the second battery unit 212_2 is within the predetermined voltage range (in step 320), When the voltage difference is within the predetermined voltage range, it implies that the added second battery unit 212_2 hardly affects the BPS 200. Hence, the second switch devices DM1 and DM2 and the first switch devices CM1 and CM2 may be turned on according to the first detection result DR1 (in step 330). By way of example but not limitation, the first detection result DR1 may include a plurality of switching control signals. When the voltage difference is within the predetermined voltage range, the switching control signals may enable the switch devices DM1, DM2, CM1 and CM2 to be turned on, respectively. Hence, both the first battery unit 212_1 and the second battery unit 212_2 may provide power output through the battery management circuit 220 (in step 370). In other words, the first battery unit 212_1 and the second battery unit 212_2 are connected electrically in parallel.

When the voltage difference is not within the predetermined voltage range, it implies that the added second battery unit 212_2 may cause the BPS 200 to generate large surge current. Hence, the detection circuit 222 may detect a power management mode of the battery apparatus 210, and the adjustment circuit 226 may refer to the detected power management mode to perform associated voltage adjustment. In this embodiment, the detection circuit 222 may detect the power management mode of the battery apparatus 210 by detecting if an external power source is coupled to the battery apparatus 210 (in step 340). When it is determined that an external power source is coupled to the battery apparatus 210, the battery apparatus 210 operates in the charging mode; when it is determined that no external power source is coupled to the battery apparatus 210, the battery apparatus 210 operates in the discharging mode or the idle mode.

Figure 4:
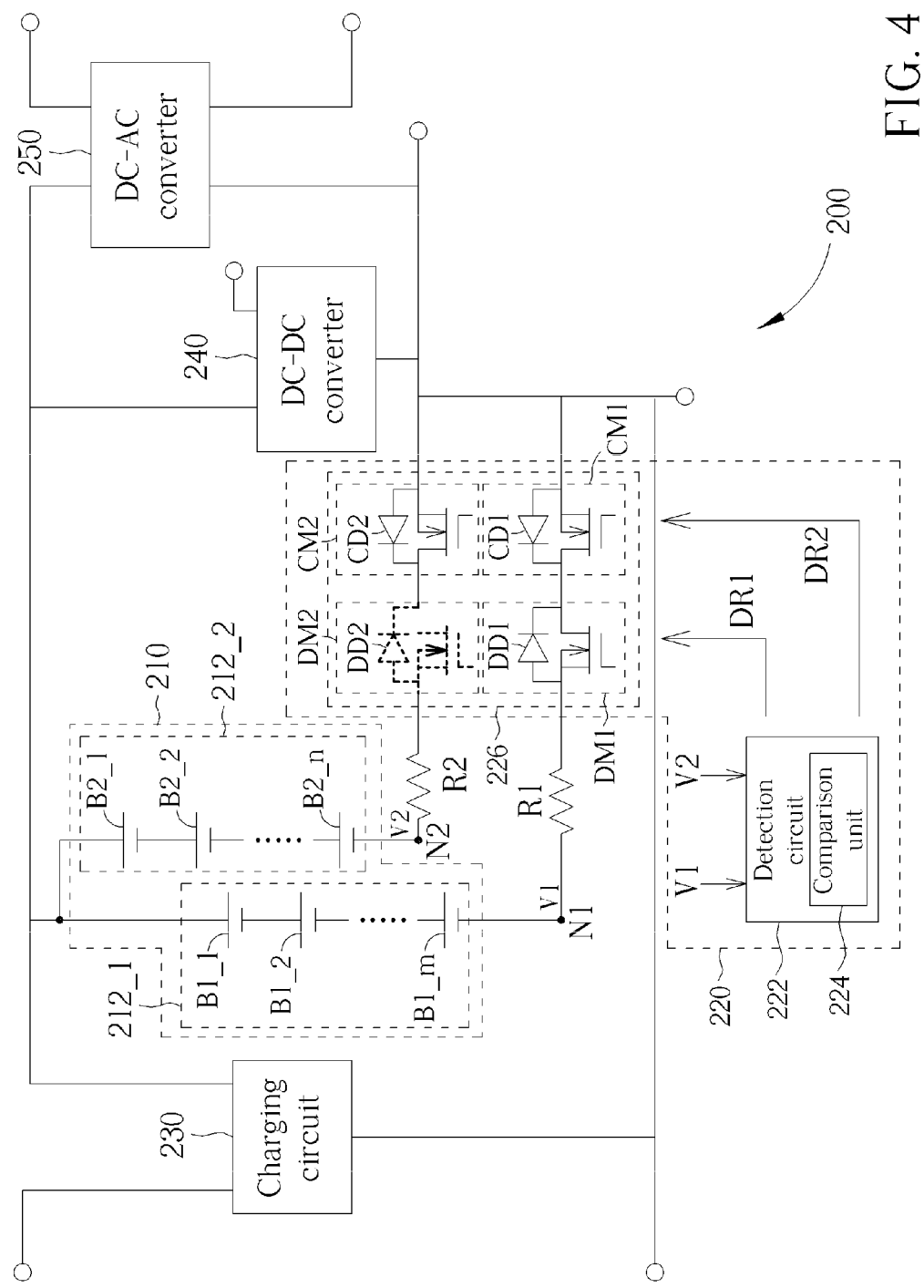
FIG. 4 is a diagram illustrating an exemplary operation of the battery apparatus shown in FIG. 2 in the charging mode.

Please refer to FIG. 4 in conjunction with FIG. 3. FIG. 4 is a diagram illustrating an exemplary operation of the battery apparatus 210 shown in FIG. 2 in the charging mode. For illustrative purposes, it is assumed that the voltage of the second battery unit 212_2 is greater than that of the first battery unit 212_1. When the battery apparatus 210 operates in the charging mode, both the first switch devices CM1 and CM2 are turned on. Please note that the smaller the voltage difference between the first battery unit 212_1 and the second battery unit 212_2 is, the less the surge current affects the BPS 200. Thus, the second switch device DM1 is turned on and the second switch device DM2 is turned off (represented by the dashed lines). The charging circuit 230 may charge the first battery unit 212_1 only, thereby reducing the voltage difference between the first battery unit 212_1 and the second battery unit 212_2 (in step 350).

During charging of the first battery unit 212_1, the detection circuit 222 may continue detecting if the voltage difference is within the predetermined voltage range (in step 354). If the voltage difference remains too great, the second switch device DM2 will stay turned off so that the voltage of the first battery unit 212_1 may keep increasing. When the voltage difference falls within the predetermined voltage range, the second switch device DM2 will be turned on (in step 358) so that the first battery unit 212_1 and the second battery unit 212_2 may provide power output through the battery management circuit 220 (in step 370).

Figure 5:
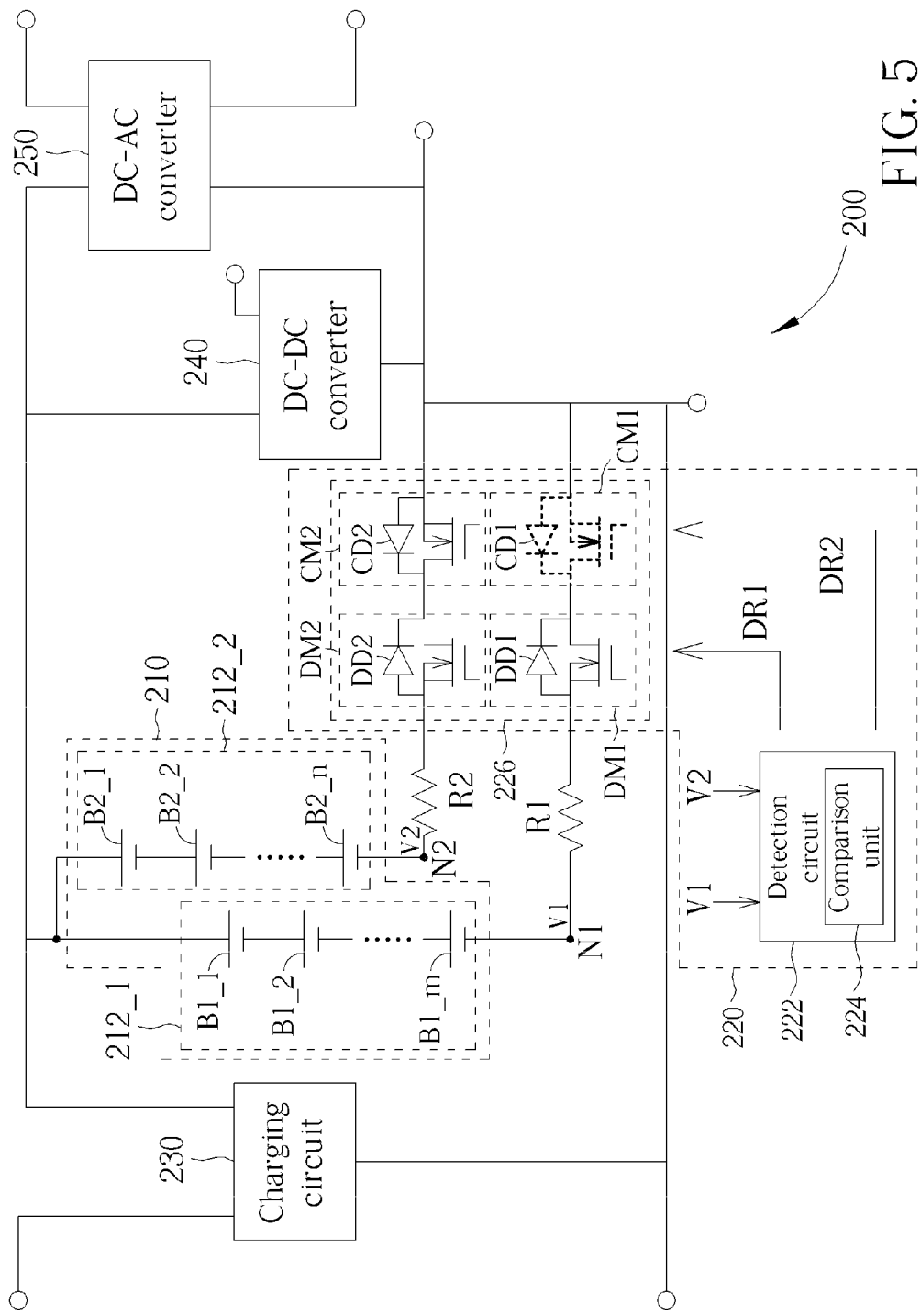
FIG. 5 is a diagram illustrating an exemplary operation of the battery apparatus shown in FIG. 2 in the discharging mode.

Please refer to FIG. 5 in conjunction with FIG. 3. FIG. 5 is a diagram illustrating an exemplary operation of the battery apparatus 210 shown in FIG. 2 in the discharging mode. For illustrative purposes, it is assumed that the voltage of the second battery unit 212_2 is greater than that of the first battery unit 212_1. When the battery apparatus 210 operates in the discharging mode, both the second switch devices DM1 and DM2 are turned on. In order to reduce the voltage difference between the first battery unit 212_1 and the second battery unit 212_2, the first switch device CM2 is turned on and the first switch device CM1 is turned off (represented by the dashed lines). Hence, only the second battery unit 212_2 discharges, which reduces the voltage difference between the first battery unit 212_1 and the second battery unit 212_2 (in step 360).

During discharging of the second battery unit 212_2, the detection circuit 222 may continue detecting if the voltage difference is within the predetermined voltage range (in step 364). If the voltage difference remains too great, the first switch device CM1 will stay turned off so that the voltage of the second battery unit 212_2 may keep decreasing. When the voltage difference falls within the predetermined voltage range, the first switch device CM1 will be turned on (in step 368) so that the first battery unit 212_1 and the second battery unit 212_2 may provide power output through the battery management circuit 220 (in step 370). As the battery management operation of the idle mode is substantially similar/identical to that of the discharging mode, further description of the battery management operation of the idle mode is omitted here for brevity.

Please refer to FIG. 2 again. The battery management mechanism associated with the battery management mode may be summarized as follows. When the first detection result DR1 indicates that the voltage relationship between the first battery unit 212_1 and the second battery unit 212_2 does not meet the predetermined voltage condition, and the second detection result DR2 indicates that the power management mode is the charging mode, the adjustment circuit 226 may increase a voltage of a lower voltage battery unit (e.g. the first battery unit 212_1) of the first battery unit 212_1 and the second battery unit 212_2 in order to meet the predetermined voltage condition. When the first detection result DR1 indicates that the voltage relationship between the first battery unit 212_1 and the second battery unit 212_2 does not meet the predetermined voltage condition, and the second detection result DR2 indicates that the power management mode is the discharging mode or the idle mode, the adjustment circuit 226 may decrease a voltage of a higher voltage battery unit (e.g. the second battery unit 212_2) of the first battery unit 212_1 and the second battery unit 212_2 in order to meet the predetermined voltage condition.

Figure 6:
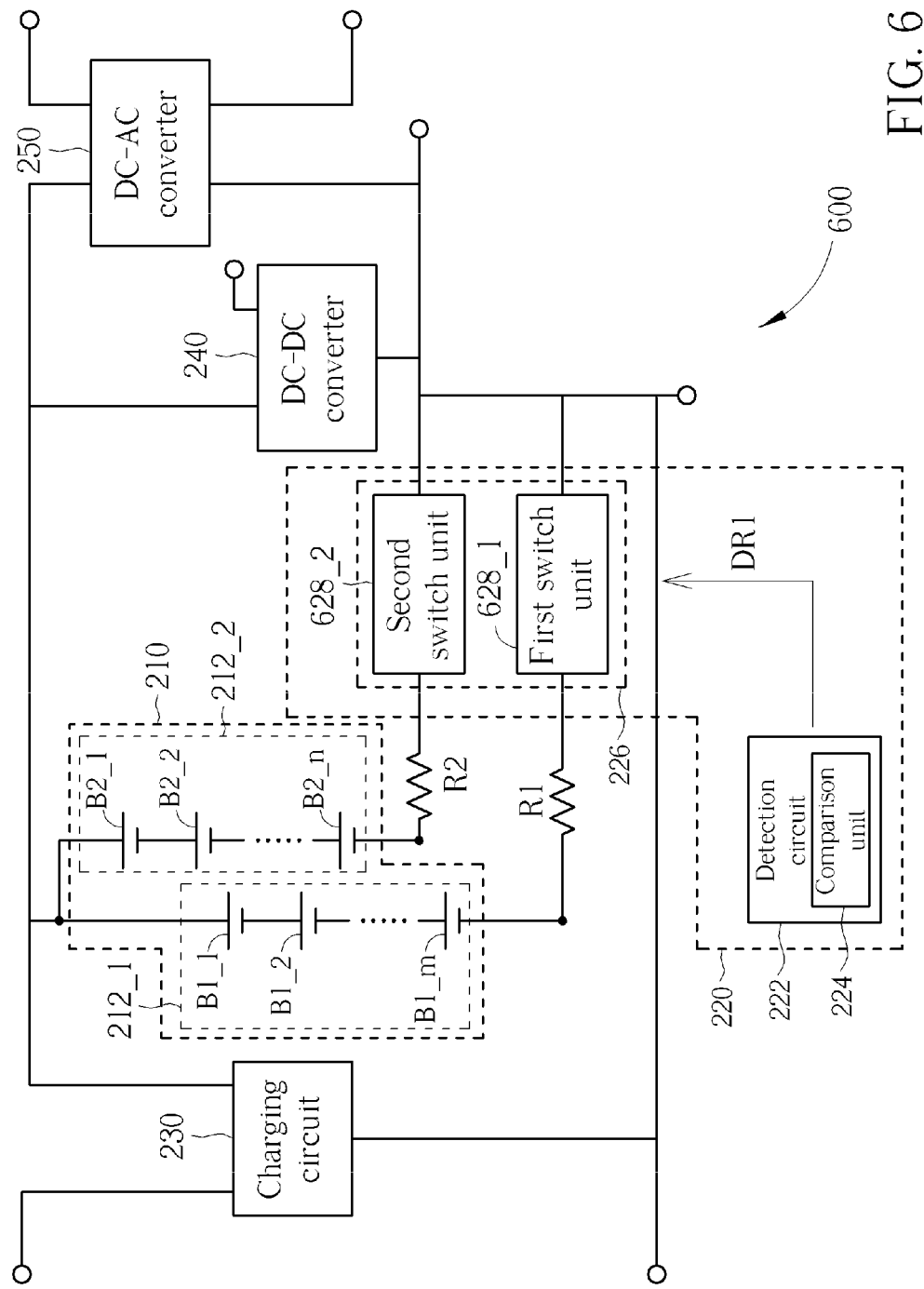
FIG. 6 is a diagram illustrating an exemplary battery power system according to another embodiment of the present invention.

In one embodiment, the second switch devices DM1 and DM2 and the first switch devices CM1 and CM2 may be implemented by other types of switch devices. For example, the switch device coupled to each battery unit may be replaced by a switch unit. Please refer to FIG. 6, which is a diagram illustrating an exemplary BPS according to another embodiment of the present invention. The architecture of the BPS 600 is based on that of the BPS 200 shown in FIG. 2, wherein the main difference is that the adjustment circuit 626 (included in the battery management circuit 620) may include a first switch unit 628_1 and a second switch unit 628_2. The first switch unit 628_1 may be implemented by the second switch device DM1 and the first switch device CM1 shown in FIG. 2, and the second switch unit 628_2 may be implemented by the second switch device DM2 and the first switch device CM2 shown in FIG. 2.

When the second battery unit 212_2 is plugged into the battery apparatus 210, the detection circuit 222 may detect a voltage relationship between the first battery unit 212_1 and the second battery unit 212_2 to generate a first detection result DR1. Next, the first switch unit 628_1 and the second switch unit 628_2 may be turned on according to the first detection result DR1, respectively. For example, when the first detection result DR1 indicates that the voltage relationship meets the predetermined voltage condition, both the first switch unit 628_1 and the second switch unit 628_2 may be turned on.

In addition, when the first detection result DR1 indicates that the voltage relationship does not meet the predetermined voltage condition, the detection circuit 222 may detect a power management mode of the battery apparatus 210, and each of the first switch unit 628_1 and the second switch unit 628_2 may be selectively turned on according to the power management mode. Consider the case where the voltage of the second battery unit 212_2 is greater than that of the first battery unit 212_1. When the power management mode is a charging mode, the first switch unit 628_1 may be turned on to adjust the voltage of the first battery unit 212_1, wherein the second switch unit 628_2 will not be turned on. When the power management mode is a discharging mode or an idle mode, the second switch unit 628_2 may be turned on to adjust the voltage of the second battery unit 212_2, wherein the first switch unit 628_1 will not be turned on. As a person skilled in the art should understand the operation of the BPS 600 shown in FIG. 6 after reading the paragraphs directed to FIG. 1-FIG. 5, further description is omitted here for brevity.

Figure 7:
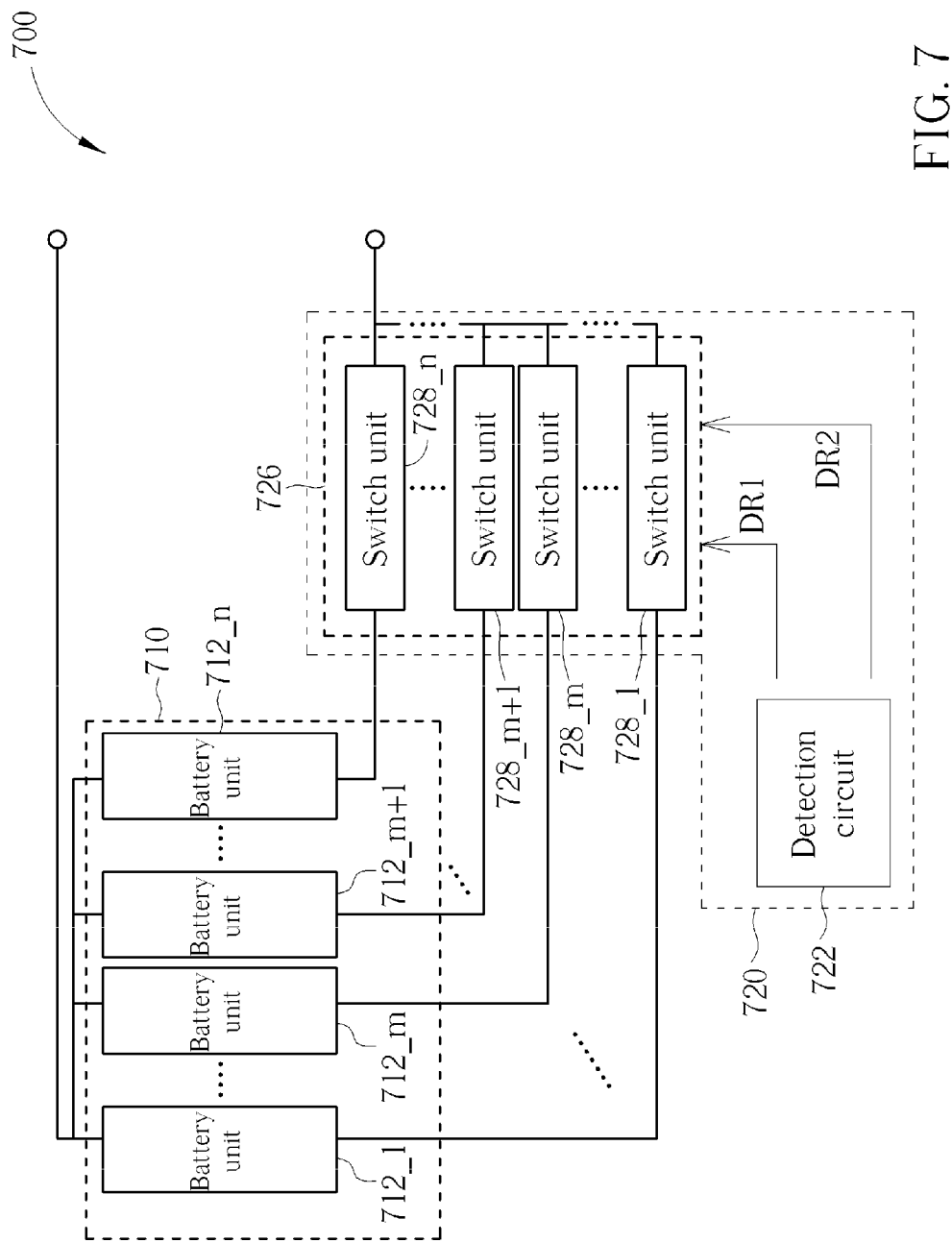
FIG. 7 is a block diagram illustrating an exemplary battery power system according to another embodiment of the present invention.

The proposed battery management mechanism is not limited to the management of two battery units. Please refer to FIG. 7, which is a block diagram illustrating an exemplary BPS according to another embodiment of the present invention. The BPS 700 may include a battery apparatus 710 and a battery management circuit 720. The battery apparatus 710 may include a plurality of battery units 712_1-712_n, and the battery management circuit 720 may include a detection circuit 722 and an adjustment circuit 726. The adjustment circuit 726 is coupled to the detection circuit 722, and includes a plurality of switch units 728_1-728_n, wherein the switch units 728_1-728_n are coupled to the battery units 712_1-712_n, respectively.

For illustrative purposes, it is assumed that after m battery units 712_1-712_m (the index m is smaller than the index n) have been installed in the battery apparatus 710, (n-m) battery units 712_m+1-712_n are plugged into the battery apparatus 710, wherein voltages of the battery units 712_1-712_m are substantially equal. The detection circuit 722 may detect a voltage relationship between the battery units 712_1-712_n to generate a first detection result DR1. Additionally, the detection circuit 722 may further detect a power management mode of the battery apparatus 710 to generate a second detection result DR2. When the first detection result DR1 indicates that the voltage relationship meets the predetermined voltage condition, each of the switch units 728_1-728_n may be turned on. When the first detection result DR1 indicates that the voltage relationship does not meet the predetermined voltage condition, each of the switch units 728_1-728_n may be selectively turned on according to the second detection result DR2 in order to adjust a voltage of at least one of the battery units 712_1-712_n. As a person skilled in the art should understand the operation of the BPS 700 shown in FIG. 7 after reading the paragraphs directed to FIG. 1-FIG. 7, further description is omitted here for brevity.

To sum up, the proposed battery management mechanism may reduce/eliminate surge current effectively and is applicable to different power management modes. The proposed battery management mechanism may also be applied to manage more than one battery unit (e.g. three battery units). Hence, even if more than one battery unit is hot-plugged/unplugged, the battery power system may still provide an excellent power output.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery management circuit for managing a battery apparatus, the battery apparatus comprising at least a first battery unit and a second battery unit connected in parallel, the battery management circuit comprising:
   a detection circuit, for detecting a voltage relationship between the first and second battery units to generate a first detection result, the detection circuit comprising:
   a comparison unit, for comparing a predetermined voltage range with a voltage difference between the first and second battery units, and accordingly generating the first detection result; and
   an adjustment circuit, coupled to the detection circuit, wherein when the voltage relationship does not meet a predetermined voltage condition, the adjustment circuit is arranged for adjusting a voltage of at least one of the first and second battery units in order to make the voltage relationship meet the predetermined voltage condition;

wherein when the voltage difference is within the predetermined voltage range, the first detection result indicates that the predetermined voltage condition is met; and when the voltage difference is not within the predetermined voltage range, the first detection result indicates that the predetermined voltage condition is not met.

2. The battery management circuit of claim 1, wherein when the first detection result indicates that the predetermined voltage condition is not met, the detection circuit further detects a power management mode of the battery apparatus to generate a second detection result, and the adjustment circuit adjusts the voltage of the at least one of the first and the second battery units according to the second detection result.

3. The battery management circuit of claim 2, wherein the detection circuit detects the power management mode of the battery apparatus by detecting if an external power source is coupled to the battery apparatus.

4. The battery management circuit of claim 2, wherein when the second detection result indicates that the power management mode is a charging mode, the adjustment circuit increases a voltage of a lower voltage battery unit of the first and second battery units in order to meet the predetermined voltage condition.

5. The battery management circuit of claim 2, wherein when the second detection result indicates that the power management mode is a discharging mode or an idle mode, the adjustment circuit decreases a voltage of a higher voltage battery unit of the first and second battery units in order to meet the predetermined voltage condition.

6. The battery management circuit of claim 1, wherein the adjustment circuit comprises:
a first switch unit, coupled to the first battery unit, wherein the first switch unit is selectively turned on according to the first detection result; and
a second switch unit, coupled to the second battery unit, wherein the second switch unit is selectively turned on according to the first detection result.

7. The battery management circuit of claim 6, wherein when the first detection result indicates that the voltage relationship meets the predetermined voltage condition, both the first and second switch units are turned on.

8. The battery management circuit of claim 7, wherein each of the first and second switch units comprises a first switch device and a second switch device; the first and second switch devices are coupled to each other; and when the first detection result indicates the voltage relationship meets the predetermined voltage condition, the first and second switch devices of each of the first and second switch units are turned on.

9. The battery management circuit of claim 6, wherein when the first detection result indicates that the voltage relationship does not meet the predetermined voltage condition, each of the first and second switch units is selectively turned on further according to a power management mode of the battery apparatus.

10. The battery management circuit of claim 9, wherein when the second detection result indicates that the power management mode is a charging mode, the first switch unit is turned on to adjust a voltage of the first battery unit, and the second switch unit is not turned on; and when the second detection result indicates that the power management mode is a discharging mode, the first switch unit is not turned on, and the second switch unit is turned on to adjust a voltage of the second battery unit.

11. The battery management circuit of claim 10, wherein each of the first and second switch units comprises a first switch device and a second switch device; the first and second switch devices are coupled to each other; when the power management mode is the charging mode, the first switch device of each of the first and second switch units is turned on, the second switch device of the first switch unit is turned on, and the second switch device of the second switch unit is turned off; and when the power management mode is the discharging mode or the idle mode, the second switch device of each of the first and second switch units is turned on, the first switch device of the second switch unit is turned on, and the first switch device of the first switch unit is turned off.

12. A battery management method for managing a battery apparatus, the battery apparatus comprising at least a first battery unit and a second battery unit connected in parallel, the battery management method comprising:
detecting a voltage relationship between the first and second battery units to generate a first detection result by comparison a predetermined voltage range with a voltage difference between the first and second battery units, and accordingly generating the first detection result; and
when the voltage relationship does not meet a predetermined voltage condition, adjusting a voltage of at least one of the first and second battery units in order to make the voltage relationship meet the predetermined voltage condition;
wherein when the voltage difference is within the predetermined voltage range, the first detection result indicates that the predetermined voltage condition is met; and when the voltage difference is not within the predetermined voltage range, the first detection result indicates that the predetermined voltage condition is not met.

13. The battery management method of claim 12, wherein when the first detection result indicates that the voltage relationship does not meet the predetermined voltage condition, the battery management method further comprises:
detecting a power management mode of the battery apparatus to generate a second detection result;
the step of adjusting the voltage of the at least one of the first and second battery units comprises:
adjusting the voltage of the at least one of the first and the second battery units according to the second detection result.

14. The battery management method of claim 13, wherein the step of detecting the power management mode of the battery apparatus to generate the second detection result comprises:
detecting the power management mode of the battery apparatus by detecting if an external power source is coupled to the battery apparatus.

15. The battery management method of claim 13, wherein when the second detection result indicates that the power management mode is a charging mode, the step of adjusting the voltage of the at least one of the first and the second battery units according to the second detection result comprises:
increasing a voltage of a lower voltage battery unit of the first and second battery units in order to meet the predetermined voltage condition.

16. The battery management method of claim 13, wherein when the second detection result indicates that the power management mode is a discharging mode or an idle mode, the step of adjusting the voltage of the at least one of the first and the second battery units according to the second detection result comprises:

decreasing a voltage of a higher voltage battery unit of the first and second battery units in order to meet the predetermined voltage condition.

\* \* \* \* \*